United States Patent [19]

Imahata

[11] Patent Number: 5,416,306
[45] Date of Patent: May 16, 1995

[54] METHOD FOR COMPARING AND VERIFYING SECURITY CODES AT POINT OF SALE

[76] Inventor: Takeo Imahata, 7390 Woodsboro Ave., Anaheim, Calif. 92807

[21] Appl. No.: 295,945

[22] Filed: Aug. 25, 1994

Related U.S. Application Data

[62] Division of Ser. No. 108,165, Aug. 16, 1993.

[51] Int. Cl.$^6$ .............................................. G06K 5/00
[52] U.S. Cl. ................................ 235/380; 902/5
[58] Field of Search ............... 235/380, 382; 902/4, 902/5; 340/825.31

[56] References Cited

U.S. PATENT DOCUMENTS 4,782,217 11/1988 Soza ........................... 235/380
4,868,900 9/1989 McGuire ..................... 235/380

FOREIGN PATENT DOCUMENTS 0203572 11/1983 Japan ........................... 902/5

Primary Examiner—Donald Hajec
Assistant Examiner—Karl D. French
Attorney, Agent, or Firm—Graham & James

[57] ABSTRACT

The present invention provides a method to prevent a fraudulent use of a credit card, a security pass card and the like. A computer system containing card account numbers is provided with corresponding security codes. For authorization of credit issuance or a security check, a computer operator feeds the account number to the computer which in turn displays the corresponding security code on a terminal display. The operator verifies that the card bearer has the same security code, thereby verifying that the card bearer is the true card holder.

4 Claims, 3 Drawing Sheets

METHOD FOR COMPARING AND VERIFYING SECURITY CODES AT POINT OF SALE

This is a divisional of application Ser. No. 08/108,165 filed on Aug. 16, 1993.

BACKGROUND OF THE INVENTION

The present invention generally relates to credit verification using credit cards, security pass cards and the like. More particularly, the present invention is directed to a method to attain an added level of security against a fraudulent use of such cards.

An automatic teller machine (ATM) typically requires a user to input a personal identification number (PIN) in connection with credit card or bank card usage. Even if a card falls into the hands of a dishonest person, a correct PIN number is still required to initiate a transaction. This requirement is a powerful deterrent for a would-be criminal. On the other hand, point-of-sale cards such as credit cards, security pass cards, debit cards and the like are even more widely used than ATM cards, but are not as secure against fraudulent use.

One problem with prior art cards is that if a cardholder loses his or her card and does not notice it immediately or does not notify the issuer right away, an illegal transaction may take place in the meanwhile. Aside from contractually shifting the responsibility of losses stemming from an illegal transaction to another party, the issuer is dependent on a store keeper or a security provider to verify the authenticity of a card bearer. However, in reality in a credit card transaction, it is rare for a retailer to ask for a separate I.D. aside from the credit card itself. The most the retailer does is to check the purchaser's signature against the one affixed on the back of the credit card. Having only a voluntary check of the signature as a safeguard against an illegal use, a card issuer as well as a business owner is vulnerable to losses stemming from such a transaction.

Where a card involved is a security pass card, the card must also be guarded against unauthorized use. A security pass card may be of a type which authorizes an access to a particular area which is otherwise off-limit. Another type of security pass may be used to keep track of comings and goings of personnel. One of the weaknesses of these cards is that the holder of the card can often pass a security point without any scrutiny unless a guard knows the face of the rightful holder of the card or the card has a photo. As long as the card itself does not alert the guard of impropriety, anyone can use it. Further, even if a guard is posted, there may be a limit to how accurately one can memorize the faces to correspond to the cards. Similarly, a security pass card having a photo is not foolproof because the size of the photo is limited and it is often difficult to tell people's faces.

In some instances, a cardholder is requested to sign out as well as checking out with a card by inserting it in a card reader. As long as the card is a valid card, falsifying someone's signature is very easy. Sometimes, a driver's license number is also requested for the sign-out book. However, it is not checked against a list.

It is of course always possible to add more personnel or hardware to enhance security. For instance, a keypad may be provided at each sales terminal of a department store for a customer to input a PIN number just as it is at an ATM terminal. However, a purchase and installation of keypads are expensive. In the alternative, a credit card issuer can keep issuing more sophisticated credit cards to card holders to stay one step ahead of increasingly sophisticated counterfeiters. But, this involves a significant research and development cost as well as expenses involved in distribution of the new cards.

It is one of the objects of the present invention to provide a method to prevent an illegal use of a credit card, security pass card and the like.

It is another object of the present invention to provide a method to facilitate safeguarding of one's credit card without requiring a significant investment in hardware and training.

It is another object of the present invention to provide a method to enhance security in a security system utilizing a pass card.

It is another object of the present invention to enhance existing computer credit or security systems.

SUMMARY OF THE INVENTION

In accordance with one embodiment of the invention, a central processing unit is provided with a list of security codes, each security code corresponding to a card account number. When a transaction is made, the account number is provided to a central computer and in response, the central computer provides the corresponding security code on a display of a terminal at the transaction location. The security code is compared with the security code provided by the card bearer via a clerk or security personnel to verify the authenticity of the card bearer.

Other objects, features and advantages of the invention will become apparent from the rest of the specification.

DETAILED DESCRIPTION OF THE INVENTION

Figure 1:
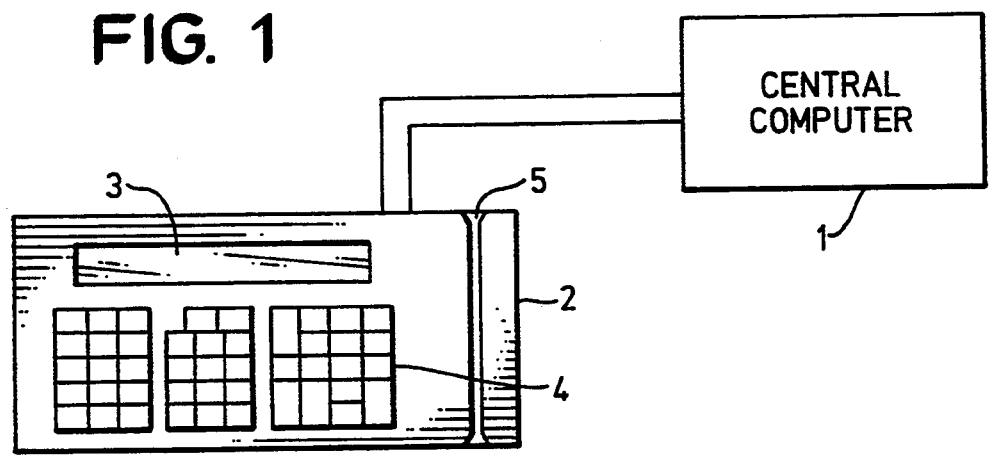
FIG. 1 is a schematic representation showing a computer system for handling a sales transaction.

First, the preferred method of the present invention is described in a purchase transaction situation using a credit card. In FIG. 1, a central computer 1 contains various account information including credit cardholder information and credit information, such as credit limits, balances, and payment histories. The central computer 1 is additionally provided with a set of security codes, and each security code corresponds to a credit card account number. The credit card account number is a number which is commonly printed on the credit card. The corresponding security code, on the other hand, does not appear on the credit card. Rather, it is committed in the cardholder's memory. A security code may be a number having a certain number of digits, or a series of alphabets or signs or a combination thereof.

When the credit card is used to make a purchase, the credit card account number is provided to the central computer 1 by using a magnetic card reader 5 on an electronic point-of-sale terminal 2. A corresponding security code is searched in the central computer and is displayed on a one-line display 3 of the terminal 2. Instead of an account number, other identifying information such as the cardholder's name or customer number may be input. For the terminal, a cash register type terminal may be employed as well which has a wider display than the one-line display 3. A terminal may or may not have a keypad and or a printer.

Next, an operator compares the security code provided by the cardholder against that which is displayed on the display 3 to verify that the bearer of the card is indeed the authorized user. If the security code provided by the central computer 1 and the security code provided by the user do not match, credit is denied and the store is alerted of a possible fraudulent use of the card.

To keep a record of the handling operator, the operator may be required to input a password or an identifier assigned to the operator using a keypad 4. The password is transmitted to the central computer to verify the authenticity of the particular operator. This precaution at the time of inputting the account number helps to reduce an unauthorized use of the terminal 2. Various transaction information such as the price, date, number of items purchased, etc. may be input using the keypad 4.

Figure 2:
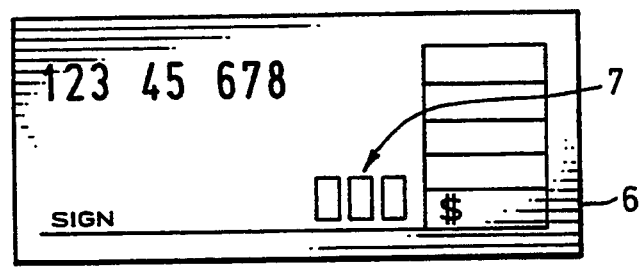
FIG. 2 is a sales slip for a use with a security code.
Figure 3:
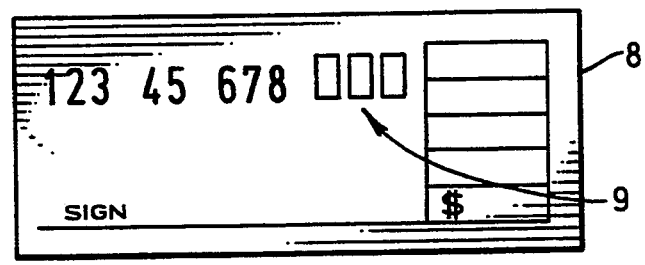
FIG. 3 is another sales slip for a use with a security code.
Figure 4:
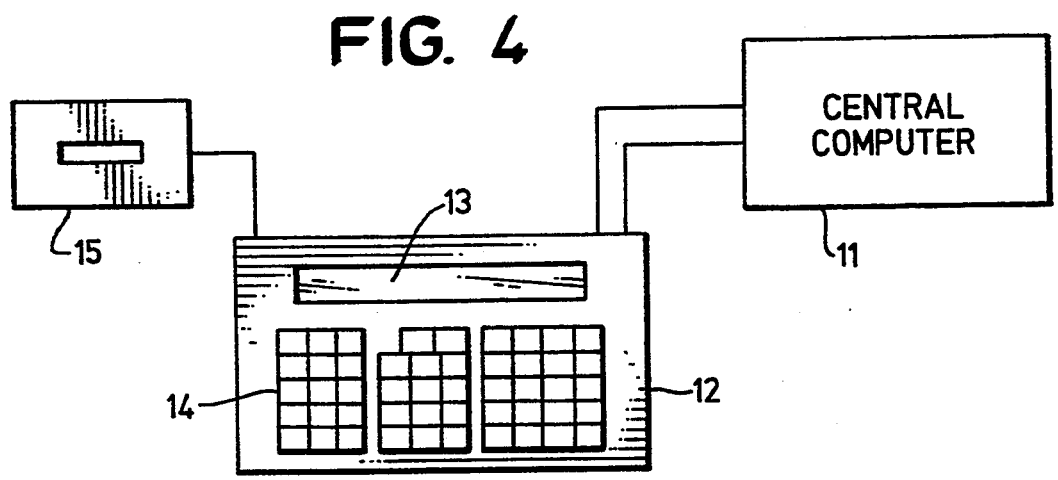
FIG. 4 is a schematic representation showing a computer security system.

A customer may provide the security code orally to the retailer, or in the alternative may be required to write the code on a sales slip and the like. Where the security code is provided on a sales slip, a format as the one shown in FIG. 2 or FIG. 3 may be used, which show sales slips 6 and 8, respectively. A space 7 or 9 for the security code is provided in both formats. One fills in the code in the boxes next to the signature as in FIG. 2 or next to the account number of the credit card as in FIG. 3.

Next, an application of the method of the present invention to a security system is described. A security pass card having identification information is commonly used to authorize an entry or exit and to keep track of entries and exits by a card bearer. According to the method of the present invention, a set of security codes are added to a central computer 11 where each security code corresponds to an account number, a name or a bearer identification number and the like. When an account number is provided to the central computer 11, the corresponding security code is accessed and displayed on the display 13 of a terminal 12 at the security checkpoint. Instead of an account number, a name or a bearer identification and the like may be provided to the central computer 11 through the terminal 12 using the keyboard 14 or a security card reader 15.

Next, a security personnel compares the security code provided by the cardholder against the security code displayed on the display 13. The security code may be provided by the cardholder orally or in writing in a log book or the like. A security code may contain alphabet letters, arabic numbers, signs or a combination thereof. If the two security code match, the cardholder is verified as the authorized user. If not, an entry or an exit is denied and an alert signal is issued on the display 13 and at the central computer 11.

Figure 5:
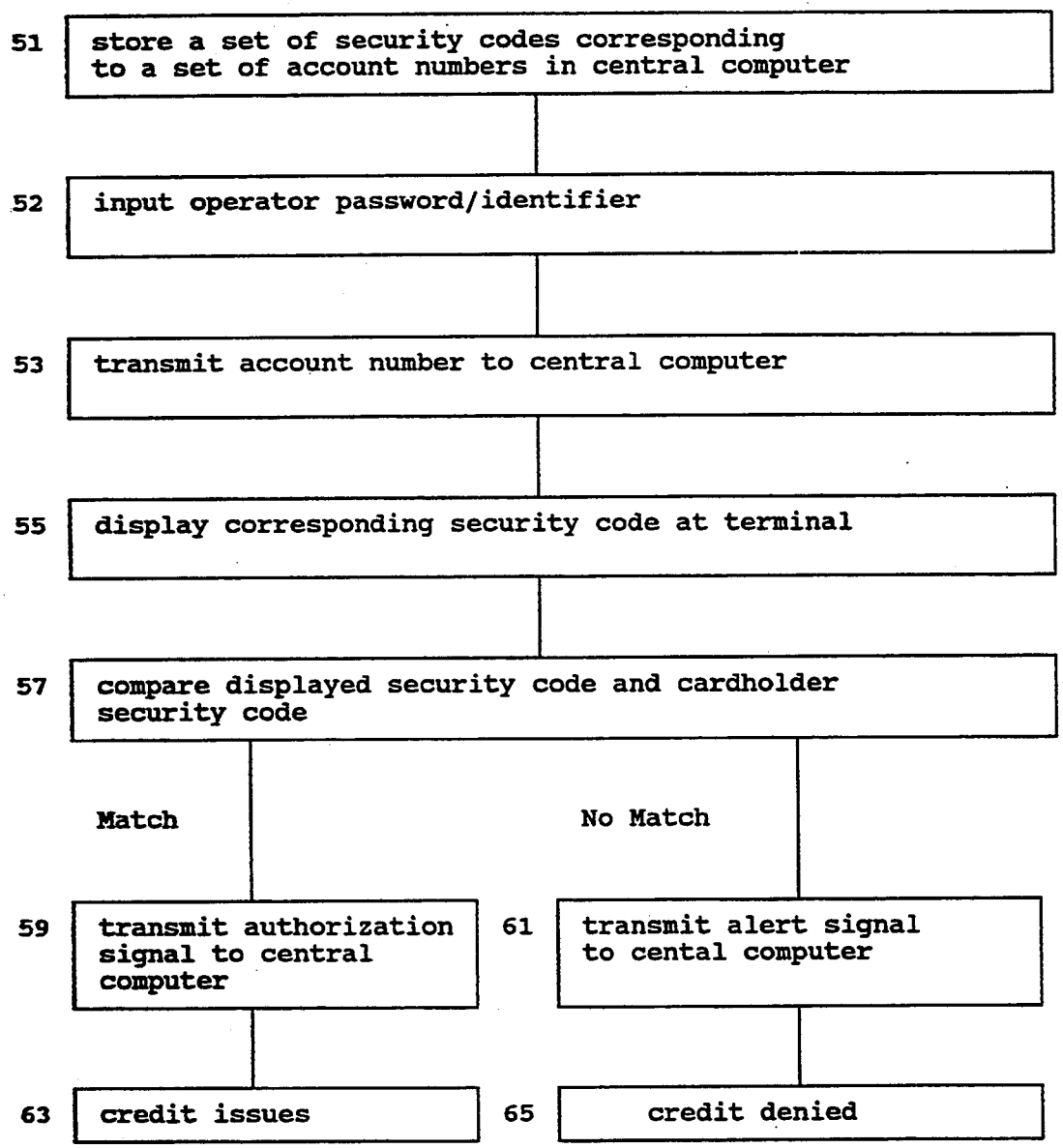
FIG. 5 is a flow chart of a method of verifying transactions according to the present invention.

FIG. 5 shows a flow chart for method for comparing and verifying security codes according to the present invention. The application illustrated here is primarily for credit cards. In step 51, a set of security codes corresponding to a set of account numbers of credit cards are stored in the central computer 1. Next, in step 52, an operator inputs a password or an identifier assigned to that operator to ensure an authorized operation of the computer. In step 53, an account number is transmitted from the terminal 2 to the central computer 1 by the operator. In step 55, a security code corresponding to the transmitted account number in step 53 is transmitted to the terminal 2 to be displayed on the display 3. In step 57, the operator compares the displayed security code and the security code presented by the card bearer. If the security codes match, in step 59, the operator transmits an authorization signal signaling that the transaction is authorized and in step 63, credit is issued. If on the other hand, the security codes do not match, the operator transmits an alert signal to the central computer 1 as shown in step 61, and issuance of credit is denied accordingly in step 65.

Figure 6:
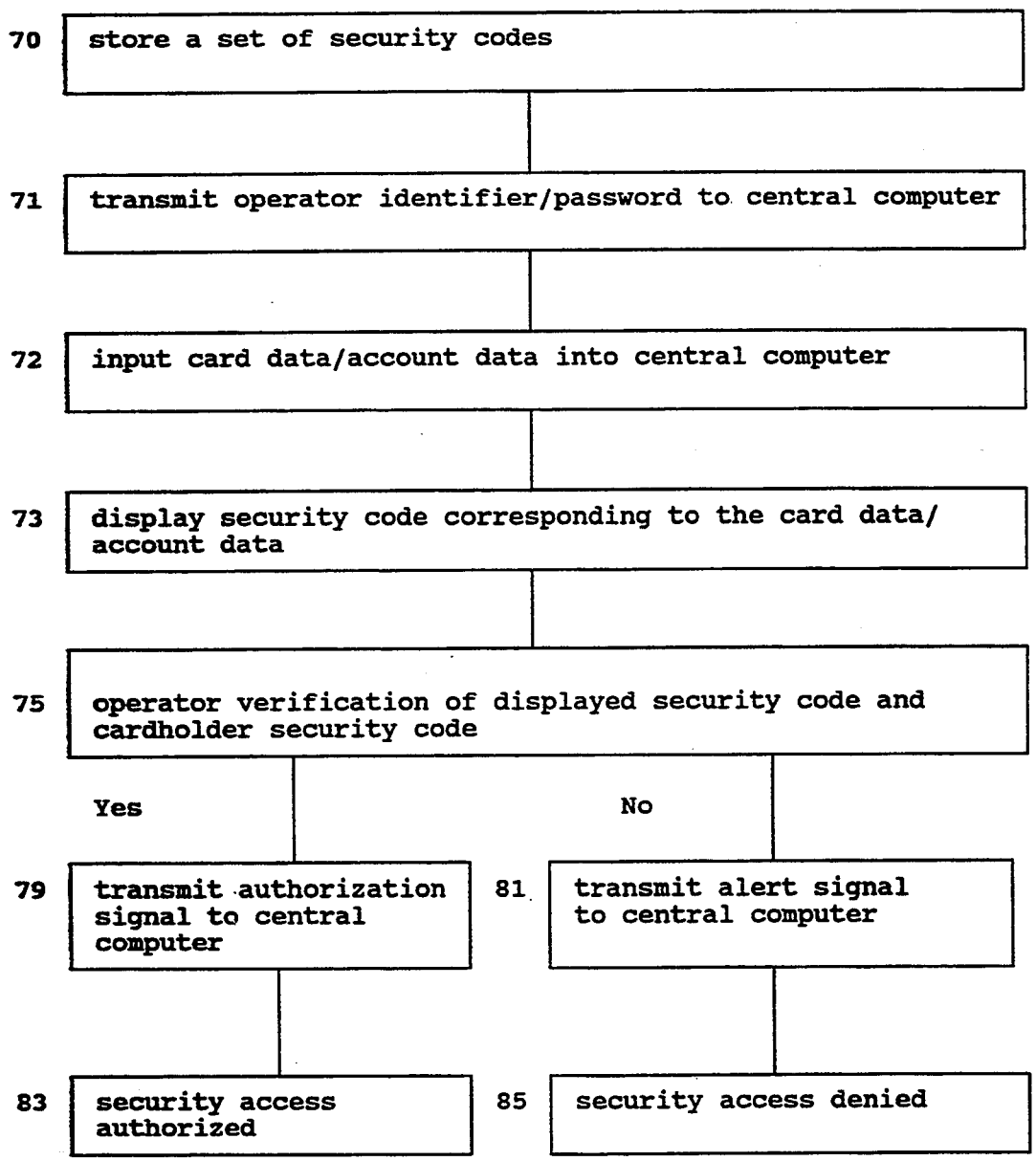
FIG. 6 is another flow chart of a method of verifying a security card according to the present invention.

In FIG. 6, another method for comparing and verifying security codes according to the present invention is shown. The illustration is for an application involving a security card. In step 70, a set of security codes corresponding to security cards are stored in the central computer 1. In step 71, an operator inputs and transmits an assigned password or identifier to ensure that an authorized security personnel is performing the verification procedure. In step 72, a piece of account data of a security card is transmitted to the central computer 1. A security code corresponding to the account data is transmitted from the computer 1 to the terminal 2 for display in step 73. Next, an operator compares and verifies the displayed security code against another presented by the security card bearer in step 75. If the two security codes match, then in step 79 an authorization signal is transmitted to the central computer 1. In step 83, security access then is authorized for the security card bearer. Permitted access may include access to a particular area or documents or the like.

If on the other hand, the security codes do not match, then an alert signal is transmitted to the central computer 1 indicating that the use is not authorized as shown in step 81. Subsequently, in step 85, access would then be denied.

While in the foregoing, preferred embodiments of the invention have been described, it should be understood to one skilled in the art that various modifications and changes can be made without departing from the true spirit and scope of the invention as recited in the appended claims.

I claim:

1. A method of verifying a credit card use, the credit card belonging to a credit card bearer, using a central computer and a terminal having a display connected thereto, comprising the steps of:

storing a set of security codes corresponding to a set of account numbers of credit cards in the central computer;

transmitting an account number from the terminal to the central computer;

transmitting a password assigned to the operator with the account number into the central computer to ensure an authorized operation of the computer; and displaying a security code corresponding to the transmitted account number on the display of the terminal, whereby the operator may compare the security code against a security code provided by the credit card bearer.

2. A method of verifying a credit card use employing a central computer and a terminal which is connected thereto and has a display, where the credit card belongs to a credit card bearer, and the central computer holds a set of account numbers of credit cards and a set of corresponding security codes comprising the steps of:

inputting an account number of a credit card into the central computer to access a corresponding security code for display on the display;

entering a password assigned to an operator into the central computer at the time of the inputting of the account number to prevent an unauthorized operation of the computer; and comparing the displayed security code against a security code provided by the credit card bearer to verify the authenticity of the credit card bearer.

3. A method of verifying an authenticity of a security card bearer in a computerized security system having a central computer and a terminal having a display connected thereto comprising the steps of:

storing a set of security codes corresponding to a set of account data of security cards in the central computer;

transmitting a piece of account data of a security card to the central computer;

transmitting an identifier assigned to a security personnel into the central computer at the time the account data of the security card is input to ensure an authorized operation of the security system;

transmitting a security code corresponding to the account data to the terminal; and displaying the security code on the display, whereby the security code may be compared against a security code furnished by the security card bearer for verification of the authenticity of the security card bearer.

4. A method of verifying an authencity of a security card bearer in a computerized security system having a central computer, the central computer having a set of security codes corresponding to a set of card data of security cards, and a terminal having a display attached to the central computer comprising the steps of:

inputting a piece of card data of a security card into the central computer;

entering an identifier assigned to a security personnel into the central computer when the piece of card data is input to ensure that the security personnel is an authorized personnel; and displaying a security code corresponding to the card data on the display, whereby the security personnel may compare the displayed security code against a security code provided by the security card bearer to verify the authenticity of the security card bearer.

* * * * *